June 4, 1968  J. S. TARRANT  3,387,146
ELECTRICAL ARRANGEMENTS

Filed Feb. 1, 1965  3 Sheets-Sheet 1

INVENTOR
John Sidney Tarrant,
BY
Pierce, Scheffler & Parker
his ATTORNEYS

United States Patent Office 3,387,146
Patented June 4, 1968

3,387,146
ELECTRICAL ARRANGEMENTS
John Sidney Tarrant, Orpington, England, assignor to Telephone Manufacturing Company Limited
Filed Feb. 1, 1965, Ser. No. 429,347
Claims priority, application Great Britain, Feb. 14, 1964, 6,245/64
5 Claims. (Cl. 307—235)

ABSTRACT OF THE DISCLOSURE

An electrical signal transmission circuit as represented by a terminal or repeat station of a multi-channel carrier telephone system in which automatic control of a variable attenuator pad constituted by a thermistor circuit arrangement is provided by operation of a comparator circuit, the input signal to the system being compared with a standard reference signal and the resultant difference signal utilized to vary the effective resistance of the thermistors in a compensating manner.

---

The present invention relates to electrical circuit arrangements susceptible to malfunctioning due to changes in ambient temperature and is concerned with improvements in such circuits to render them less sensitive or substantially insensitive to such changes.

According to one aspect of the invention there is provided an electrical signal transmission circuit including a circuit element of which the resistance value varies with changes in ambient temperature and connected in parallel with said element a current source responsive to said ambient temperature changes to vary the current supplied thereby in a sense to compensate for the variation in resistance value of said element.

According to another aspect of the invention there is provided an electrical signal transmission circuit including a semiconductor rectifier of which the volts drop varies with changes in ambient temperature and connected in parallel with said rectifier a further rectifier having substantially the same temperature characteristic as the first mentioned rectifier in series wtih a bias voltage source serving to render said further rectifier conductive, the two rectifiers being oppositely poled whereby variations in volts drop of said first mentioned rectifier due to ambient temperature changes are compensated by said further rectifier.

According to a further aspect of the invention there is provided an electrical signal transmission circuit including a thermistor and connected in parallel with said thermistor an amplifier stage having the heater element of said thermistor in its output whereby changes in the resistance value of said thermistor due to changes in ambient temperature cause changes in the feedback to said amplifier provided by said thermistor to vary the output of said amplifier flowing through said heater element in a sense to compensate for such changes in resistance value.

Figure 1:
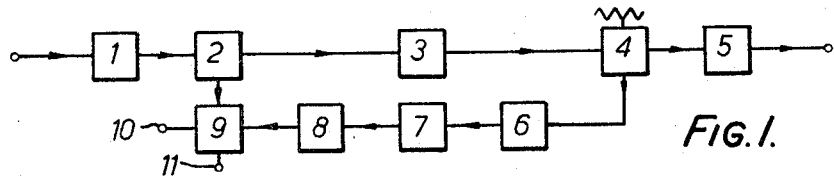

The various features and advantages of the invention will be apparent from the following description of a pilot signal controlled gain regulation system embodying the invention taken with reference to the accompanying drawings in which:

FIGURE 1 is a block schematic diagram of an automatic gain regulating system.

Figure 2:
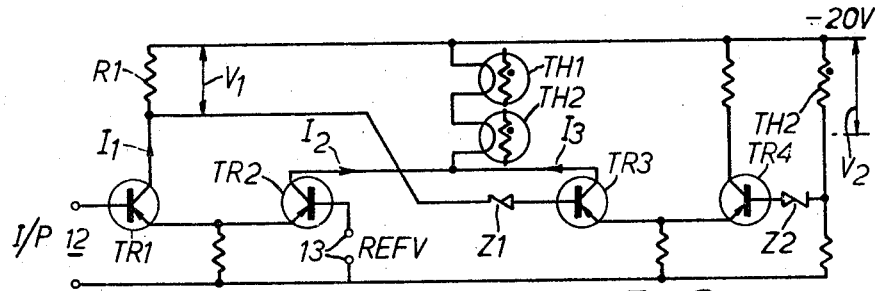
Figure 3:
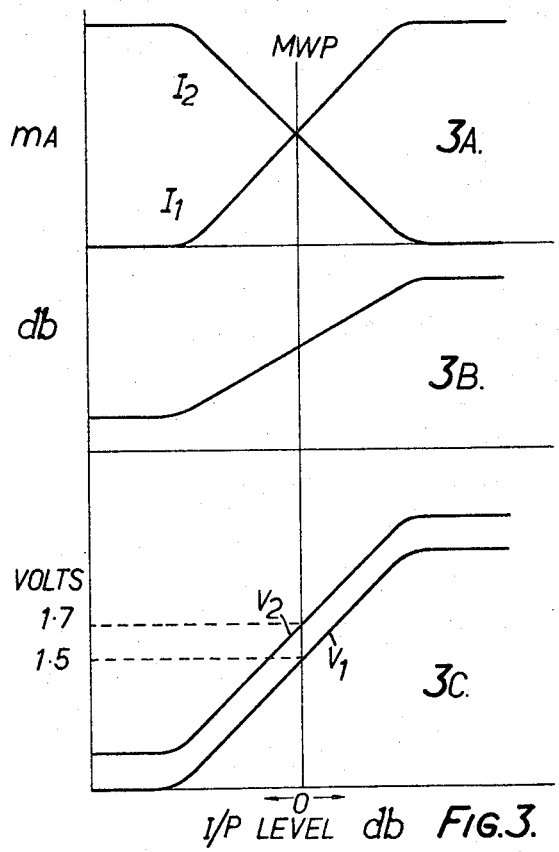
Figure 4:
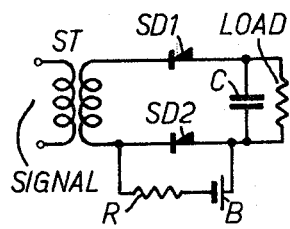
Figure 5:
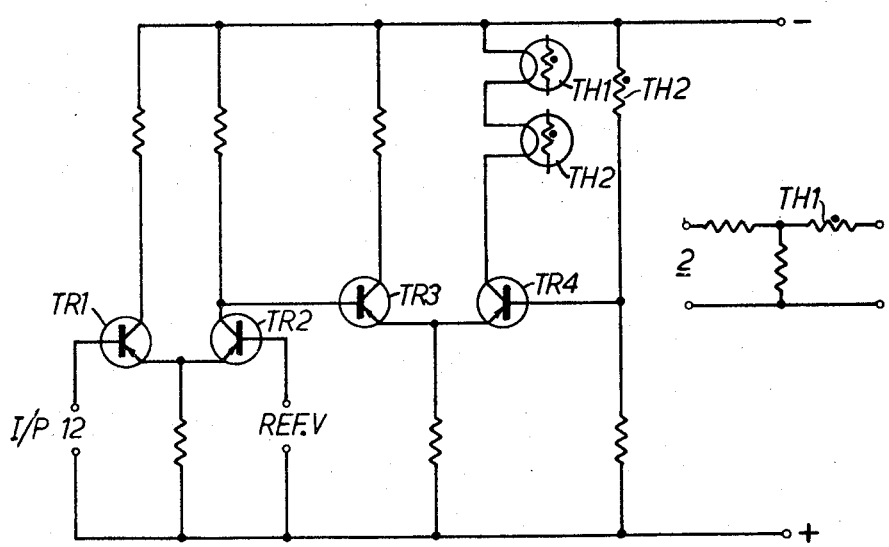
Figure 6:
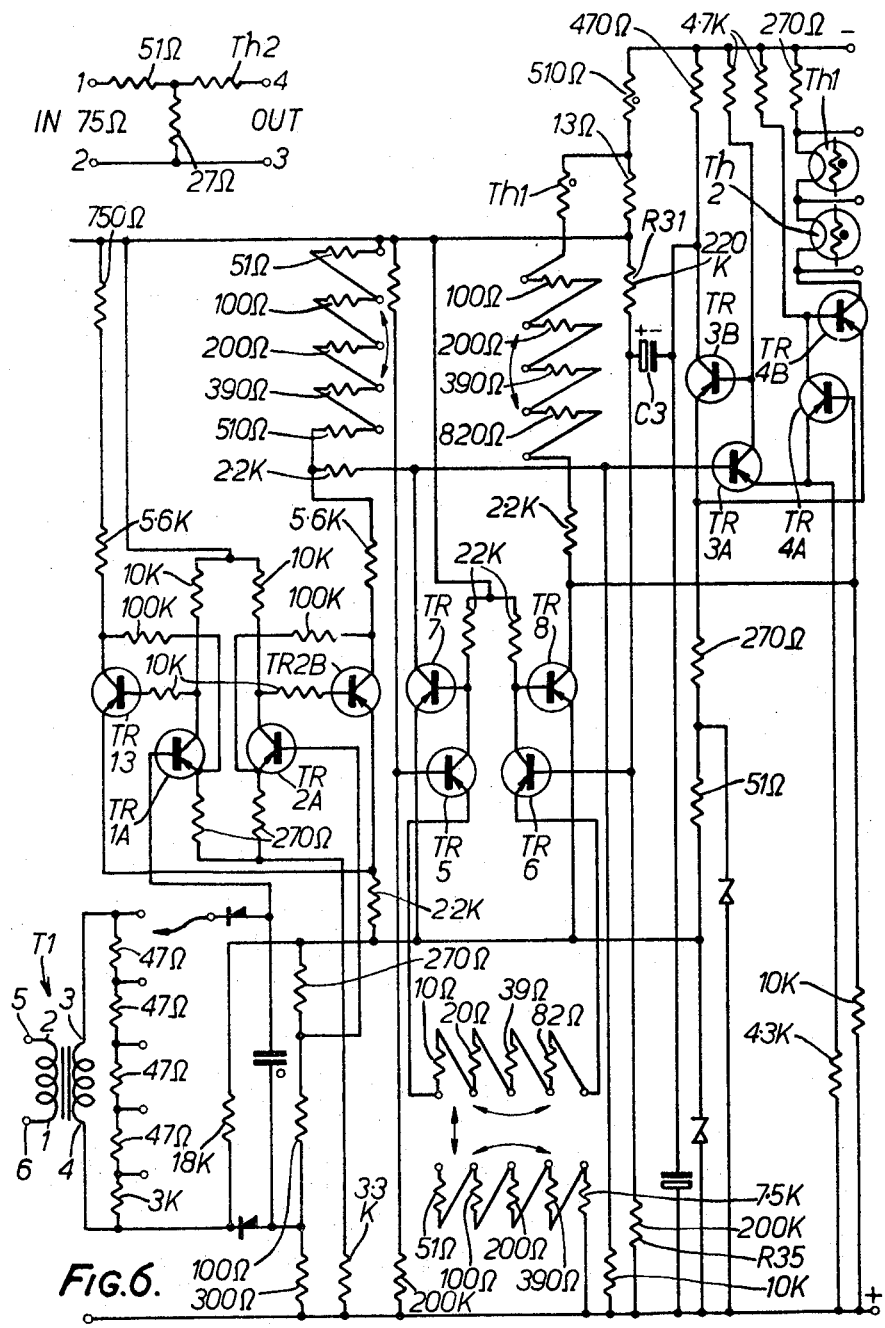

FIGURE 2 is a circuit diagram of the comparator circuit of the system of FIGURE 1, FIGURE 3 shows curves which assist in understanding the operation of the system of FIGURES 1 and 2, FIGURE 4 is a circuit diagram of the signal rectifying circuit of the system of FIGURE 1, FIGURE 5 is a simplified circuit diagram of a modification of the comparator of FIGURE 2, and FIGURE 6 is a full circuit diagram of the comparator of FIGURE 5.

Referring to FIGURE 1 there is shown in block schematic form an automatic gain regulation system of a terminal or repeater station of a multichannel carrier telephone system in which 1 represents a manually controlled variable attenuation pad into which incoming group and pilot signals are fed, 2 represents an automatically controlled variable attenuation pad, 3 represents a group amplifier, 4 represetns a hybrid transformer and 5 represents another manually controlled variable attenuation pad connected to the output of the system. The automatic control of pad 2 is provided by a signal derived from the hybrid transformer 4 and fed through a narrow band filter which rejects the group channel signals and passes the pilot signal to an amplifier 7 feeding a rectifying circuit 8 which provides a direct current signal input to a comparator 9. In comparator 9 this input signal is compared with a standard reference signal applied to terminal 10 and the resultant difference signal controls pad 2. If the difference lies outside a predetermined range an alarm signal is provided by comparator 9 at terminal 11.

The comparator 9 of FIGURE 1 is shown in detail in FIGURE 2. It comprises four transistors TR1–TR4 connected to form two long tailed pairs TR1–TR2 and TR3–TR4. By "long-tailed pair" is meant a pair of transistors having their emitters connected to a supply line through a common resistor. The amplified and rectified pilot signal from rectifying circuit 8 of FIGURE 1 is applied to input terminal 12 and thus to the base of transistor TR1 while a reference signal is applied at terminal 13 and thus to the base of transistor TR2. The collector of TR1 is connected to the negative supply line through a resistor R1 and the collector current I1 of TR1 develops a voltage V1 across resistor R1. The collector of TR2 is connected to the negative supply line through the serially conencted heater elements of two thermistors TH1 and TH2 the resistance elements of which are respectively connected in the attenuator pad 2 of FIGURE 1 and between the negative supply line and the base of transistor TR4. The collector current I2 of TR2 thus determines the voltage V2 dropped across the resitsance element of TH2.

The arrangement is of TR1, TR2 is in effect a differential amplifier and it is so arranged that when the input pilot signal at 12 is equal to the reference signal at 13, I1 is equal to I2 and this is taken as the mean working point indicated by the vertical line MWP in FIGURE 3. As appears from curve 3A, if the pilot signal level falls I2 increases and I1 decreases. The increase in I2 raises the temperatures of TH1 and TH2. The resistance element of TH1 is thus reduced in value and the attenuation of pad 2 is reduced (see curve 3B) thereby increasing the pilot signal level until it is approximately equal to the reference signal level. The opposite relationships of I2 and I1 produce an increase in attenuation when the pilot signal level rises.

The resistance element of TH2 is also reduced in value so that the voltage V2 falls. However the decrease in I1 also causes a reduction in the value of V1 and as can be seen from the curves 3C these two voltages V1 and V2 follow each other with change in input level maintaining a small constant difference between them.

The significance of this constant voltage differential will be apparent from consideration of the second long tailed pair constituted by transistors TR3 and TR4. The bases of these transistors are connected to Zener diodes Z1 and Z2 respectively connected to resistor R1 and the resistance element of TH2 and the diodes D1 and D2 are chosen to have characteristic voltages which differ by the voltage differential between V1 and V2. Thus with changes in level of input pilot signal the base currents of TR3 and TR4 remain equal and the collector current I3 of TR3 remains constant.

However, when the ambient temperature changes, the thermistors TH1 and TH2 are affected and the resistance values of their resistance elements are changed. This change produces a change in the differential between V1 and V2 since it affects V2 without affecting V1. Due to the matching of diodes D1 and D2 to the initial voltage differential between V1 and V2 any change in that differential produces inequality in the base currents to TR3 and TR4 with the result that the collector current I3 changes. It is arranged that with increase in ambient temperatures the fall in V2 brings about a fall in I3 sufficient to reduce the temperature of the heating elements of TH1 and TH2 by an amount substantially equal to the rise in ambient temperature so that the values of the resistance elements of TH1 and TH2 are restored to the initial levels and the effects on pad 2 of change in value of the resistance element of TH1 are eliminated.

As previously mentioned, the input pilot signal to the comparator of FIGURE 2 is provided by the rectifying circuit 8 of FIGURE 1 which is shown in detail in FIGURE 4. This circuit, in its conventional form, consists of a semiconductor diode SD1 connected between a signal transformer ST fed with the amplified pilot signal from amplifier 7 of FIGURE 1 and a load represented by the load resistor L which is, or is connected to, the input of comparator 9 and is shunted by a capacitor C. The voltage drop across a semiconductor diode varies with change in ambient temperature and where the magnitude of such change represents a substantial percentage of the voltage level of the input signal such variation could produce substantial inaccuracy in the level of pilot signal applied to the input of the comparator. In order to eliminate this inaccuracy the conventional rectifying circuit just described is modified by the addition of a second semiconductor diode SD2 having substantially the same thermal characteristics as SD1 and by the application to SD2 of a bias sufficient to maintain it in conductive state, the polarity of SD2 being opposite to that of SD1. With such an arrangement, shown in FIGURE 4, the effect of the voltage drop across SD1 is compensated by an equal voltage drop across SD2 and since both diodes have the same thermal characteristics, the effects of changes in ambient temperature on SD1 are matched by equal and oppositely acting effects on SD2 and the rectifying circuit is rendered insensitive to changes in ambient temperature normally to be encountered.

With the rectifying circuit insensitive to temperature change it is not necessary to raise the pilot frequency level to such a degree as is necessary in conventional signal rectifying systems and considerably less amplification is required in amplifier 7 of FIGURE 1.

Referring back to FIGURE 2, it will be appreciated that since the sum of the currents in the two differential outputs of a long-tailed pair is constant the effect of variation of pilot signal input is to increase one output and decrease the other so that either output of the first long-tailed pair TR1, TR2 can be employed as the reference signal input to the second long-tailed pair TR3, TR4 provided the output of the second pair which is employed to vary the thermistor heating current is selected appropriately to ensure the required adjustment of the attenuator pad attenuation level in response to pilot signal variation.

It will also be appreciated that the provision of a common collector circuit for TR2 and TR3 which includes the heater elements of thermistors TH1 and TH2 is not essential to provide temperature compensation in the long-tailed pair TR3, TR4 it being possible to use solely one of the outputs of this pair TR3, TR4 to energise the heater elements.

Such a modified form of the comparator of FIGURE 2 is shown in FIGURE 5 wherein the current for the heaters of thermistors TH1 and TH2 is derived solely from the long-tailed pair TR3 and TR4 so that the Zener diodes Z1 and Z2 of FIGURE 2 are no longer necessary. Also the thermistor heaters are connected in the collector circuit of transistor TR4 and the base drive for transistor TR3 is derived from the collector of TR2 instead of TR1 as in FIGURE 2.

In the circuit of FIGURE 5, as in the circuit of FIGURE 2, the input pilot signal is compared with a reference voltage in the differential amplifier constituted by the long-tailed pair TR1, TR2, and the base drive for TR3 of the second long-tailed pair TR3, TR4 is derived from one of the differential outputs of TR1, TR2, in this case the collector output of TR2. This base drive of TR3 is effectively compared in the second long-tailed pair with a voltage determined by the resistance element of thermistor TH2, and one of the differential outputs of TR3, TR4, in this case of the collector output of TR4, flows through the heater element of thermistor TH2 with the result that is adjusts itself to maintain the desired relationship between the reference voltage V2 developed across the resistance element of thermistor TH2 and the voltage V1 developed by the collector output of TR2 as determined by the level of the input pilot signal. Since the heater element of thermistor TH1 is in series with that of TH2 in the collector circuit of TR4 the attenuation of the pad is adjusted by variation of the resistive value of the resistance element of TH1 produced by variation in the collector current of TR4. Also in this circuit, as in that of FIGURE 2, changes in ambient temperature affecting the thermistors TH1 and TH2 bring into effect changes in the base drive of TR4 which produce compensating changes in the collector current of TR4 and thus in the heating of the heating elements of TH1 and TH2.

A circuit diagram of a practical embodiment of the arrangement of FIGURE 5 is shown in FIGURE 6 in which the two long-tailed pairs are each a two stage pair constituted respectively by the transistors TR1A, TR1B, TR2A, TR2B and TR3A, TR3B, TR4A and TR4B. Also shown in FIGURE 6 is a further two stage long-tailed pair TR5–TR8 which is capacitatively coupled to the second long-tailed pair of the comparator to form a Miller integrating circuit. The function of this latter circuit is to determine the speed of response of the comparator circuit to variations in pilot level and it operates as follows:

When the potential at the base of TR3A tends to go negative transistor TR7 is caused to conduct and prevent such change. When the potential at the base of TR3A tends to go positive transistor TR8 is caused to conduct and takes the base of TR4A positive thus tending to prevent any change for a period determined by the values of the capacitor C3 resistors R31 and R35 in relation to the overall gain of the two stages. With the values shown a relatively slow response is obtained.

In the comparator circuits of FIGURES 2, 5 and 6 because two thermistors of similar temperature characteristics are employed and because one is arranged to control the gain of the stage providing the heater current for the other, it is ensured that the amount of temperature compensation introduced is correct no matter what point on its characteristic the other thermistor is operating at when an ambient temperature change takes place. Thus as a result, no matter what level of attenuation pad loss is currently being determined by the resistance value of the resistance element of thermistor TH1, as set by the level of the input pilot signal, any change in such resistance value occasioned by ambient temperature variation is accompanied by a like change in the resistance value of the resistance element of thermistor TH2 which in taking place produce sufficient change in the collector current of the transistor supplying the heater current for both thermistors to maintain both resistance elements at correct operating temperature and thus to maintain constant the pad loss.

It will be appreciated that the long-tailed pairs of FIGURES 2 and 5 could equally be two-stage pairs as in FIGURE 6.

I claim:

1. An electric signal transmission circuit having a transmission attenuation which is variable in accordance with variations in level of a pilot signal comprising a signal attenuator having signal input and signal output means and resistance means connected between said input and output means, at least part of said resistance means being constituted by the resistance element of a first indirectly heated thermistor, a first differential amplifier comprising first and second transistors having their emitters connected to a supply line through a common resistor, means for applying said pilot signal to the base of said first transistors, a reference voltage source connected to the base of said second transistor, a second differential amplifier constituted by third and fourth transistors having their emitters connected to a supply line through a common resistor, resistance means including the resistance element of a second indirectly heated thermistor connected in parallel with said fourth transistor, a first Zener diode connecting the base of said fourth transistor with one end of said second thermistor resistance element, a second Zener diode connecting the collector of said first transistor to the base of said third transistor, and a common collector circuit for said second and third transistors said common circuit including the heater elements of both said first and second thermistors.

2. An electric signals tranmission circuit having a transmission attenuation which is variable in accordance with variations in level of a pilot signal comprising a signal attenuator having signal input and signal output means and resistance means connected between said input and output means, at least part of said resistance means being constituted by the resistance element of a first indirectly heated thermistor, a first differential amplifier comprising first and second transistors having their emitters connected to a supply line through a common resistor, means for applying said pilot signal to the base of said first transistors, a reference voltage source connected to the base of said second transistor, a second differential amplifier constituted by third and fourth transistors having their emitters connected to a supply line through a common resistor, resistance means including the resistance element of a second indirectly heated thermistor connected in parallel with said fourth transistor, means connecting the base of said fourth transistor to one end of said second thermistor resistance element, means connecting the collector of said second transistor to the base of said third transistor, and means connecting the collector of said fourth transistor in series with the heater elements of said first and second thermitsors.

3. An electric signal transmission circuit as set forth in claim 2 wherein said collector of said fourth transistor is connected through said heater elements to the other end of said second thermistor resistance element.

4. An electric signal transmission circuit as set forth in claim 10 wherein said first differential amplifier is constituted by first and second pairs of transistors connected as a two-stage amplifier, each such pair of transistors having the emitters of the pair connected to a supply line through a common resistor.

5. An electric signal transmission circuit as set forth in claim 2 wherein said second differential amplifier is constituted by first and second pairs of transistors connected as a two-stage amplifier, each such pair of transistors having the emitters of the pair connected to a supply line through a common resistor.

References Cited

UNITED STATES PATENTS

| | | | |
|---|---|---|---|
| 2,378,620 | 6/1945 | Chatterjea et al. | 325—415 |
| 2,426,589 | 9/1947 | Bollman | 330—143 |
| 2,660,625 | 11/1953 | Harrison | 330—143 |
| 3,109,992 | 11/1963 | Elliott | 307—88.5 |
| 3,218,570 | 11/1965 | Godier | 330—143 |

ARTHUR GAUSS, *Primary Examiner.*

H. DIXON, *Assistant Examiner.*